US008660969B1

United States Patent
Hall et al.

(10) Patent No.: US 8,660,969 B1
(45) Date of Patent: Feb. 25, 2014

(54) TRAINING DEPENDENCY PARSERS BY JOINTLY OPTIMIZING MULTIPLE OBJECTIVES

(75) Inventors: Keith Hall, Zurich (CH); Jason Katz-Brown, Richmond, CA (US); Ryan McDonald, New York, NY (US)

(73) Assignee: Google Inc., Mountain View, CA (US)

( * ) Notice: Subject to any disclaimer, the term of this patent is extended or adjusted under 35 U.S.C. 154(b) by 342 days.

(21) Appl. No.: 13/174,699

(22) Filed: Jun. 30, 2011

(51) Int. Cl.
*G06N 5/00* (2006.01)

(52) U.S. Cl.
USPC .............................................. 706/12; 706/45

(58) Field of Classification Search
USPC ..................................................... 706/12, 45
See application file for complete search history.

(56) References Cited

PUBLICATIONS

Hall, et al., Training dependency parsers by jointly optimizing multiple objectives, Proceedings of the 2011 Conference on Empirical Methods in Natural Language Processing, Jul. 2011, pp. 1-11.*
Hall, et al., Training Structured Prediction Models with Extrinsic Loss Functions, NIPS '11, Nov. 2011, pp. 1-6.*
Ming-Wei Chang et al., "Guiding Semi-Supervision with Constraint-Driven Learning," Proceedings of the 45th Annual Meeting of the Association of Computational Linguistics, pp. 280-287, Prague, Czech Republic, 2007.
Ming-Wei Chang et al., "Structured Output Learning with Indirect Supervision," Proceedings of the 27th International Conference on Machine Learning, Haifa, Israel, 2010.

* cited by examiner

*Primary Examiner* — Wilbert L Starks
(74) *Attorney, Agent, or Firm* — Morris & Kamlay LLP

(57) ABSTRACT

A plurality of highest intrinsically-ranked parser outputs are scored using an extrinsic metric that is relevant to one or more downstream applications. The parser can be trained by using an extrinsically highly-ranked parse selected from among the intrinsically highly-ranked parses. The selected parse need not be the highest intrinsically-ranked parse. In this way, a parser can be trained to produce better results for downstream applications.

20 Claims, 3 Drawing Sheets

TRAINING DEPENDENCY PARSERS BY JOINTLY OPTIMIZING MULTIPLE OBJECTIVES

BACKGROUND

A dependency parser may analyze syntax and build a data structure (e.g., often some kind of parse tree, abstract syntax tree or other hierarchical structure) implicit in the input tokens. Many modern parsers are at least partly statistical and rely on a corpus of training data that has already been annotated (e.g., parsed by hand), such as a Treebank. This approach allows the parser to gather information about the frequency with which various constructions occur in specific contexts and to build an inductive statistical model that allows the parser to create (e.g., induce, propose, hypothesize, etc.) grammatical structures (parses) from previously unseen sentences.

The speed and accuracy of dependency parsers render them useful for downstream natural language processing tasks. These tasks include, but are not limited to, work on question answering, sentiment analysis, machine translation reordering, etc. Such downstream processing tasks may pertain to special applications whose requirements may differ in some ways from colloquial applications. For example, areas with specific jargon (e.g., medicine, patent law, engineering, etc.) may require different parses of a given sentence than the most correct generic parse. For example, the word "chocolate" may require a parse that translates it into the word for confectionary chocolate in another language when translating a generic document, but the same word may require a parse that translates it into the equivalent of "dark brown" when translating a document specific to the color trades, such as painters, dyers, clothiers, etc.

Examples of parsers include graph based parsers, transition based parsers, chart parsers, etc., or a combination thereof. A graph based parser can be a type of parser which may generate a parser model which may rank associated dependency graphs and subsequently search for dependency graphs with the most desirable ranking A transition based parser may rank transitions between parser states based on the parse history and subsequently search for the highest-scoring transition sequences that derive a complete dependency graph. Transition based parsers rely on machine learning to induce a model for predicting the transition sequence used by the parser to construct the dependency graph. A chart parser includes a type of parser suitable for ambiguous grammars, including grammars of natural languages. It may use the dynamic programming approach wherein partial hypothesized results may be stored in a structure called a chart and can be re-used. In accordance with embodiments of the disclosed subject matter, a chart parser may use the Cocke-Younger-Kasami (CYK) algorithm. The CYK algorithm considers every possible subsequence of the sequence of words and sets a series of Booleans, P[i,j,k], to be true if the subsequence of words starting from i of length j can be generated from a non-terminal symbol in a grammar, $R_k$. Once it has considered subsequences of length 1, it may go on to subsequences of length 2, and so on. For subsequences of length 2 and greater, it may consider every possible partition of the subsequence into two parts, and determine if there is some production P→Q R such that Q matches the first part and R matches the second part. Accordingly, it may record P as matching the whole subsequence. Once this process is completed, the sentence may be recognized by the grammar if the subsequence containing the entire sentence is matched by the start symbol.

Parser data can include parser training data and parser model parameters. Parser training data can include a set of <sentence, reference parse tree> pairs, <word, reference word> pairs, etc. Parser model parameters can include a set of statistical parameters that the parser can use to score candidate parses, e.g., to compute an intrinsic parser metric for a candidate parse. These parameters can be trained (modified) using parser training data. For example, in the baseline parser, the likelihood of "red" being labeled as an adjective given that it is followed by "car" might be 0.2. But after retraining, the likelihood may increase, say, to 0.7. The parser may then be better at parsing the specific sentence, "the red car is faster than the blue car," but any sentence containing "red car", "blue car" and the other grammatical constructions in the specific sentence that are also present in other sentences. Parser data can be modified in other ways. For example, parse trees can be reordered, dependency statistics may be changed, etc. The effect of such modifications can include increasing the likelihood that a subsequent parse is more likely to reflect at least some of the properties of one or more elements of a training set. Examples of parser data can include phrases, training data, weighting factors, phrase tables, properties of the words, information about the syntactic structure of the phrase (such as dependencies), the grammar, etc., or a combination thereof. A phrase can include any number of words, numbers, characters, punctuation or other such entities or combination thereof. Within the parser, a phrase or phrases can be associated with structures and/or additional information (e.g., attributes, etc.) such as hierarchies, rules, parse trees, part-of-speech tags, counts, probabilities, semantic categories, etc., or combination thereof.

BRIEF SUMMARY

According to an embodiment of the disclosed subject matter, an implementation may receive a first dataset including a first given source and a corresponding first given target. The first given source may be parsed to determine a first parsed target output in accordance with a parsing model having a first parsing parameter. An intrinsic loss may be determined based upon an intrinsic loss function, the first parsed target, and the first given target. A second dataset containing a second given source and a corresponding second given target may be received. The second given source input may be parsed to generate k-best parses including a 1-best parse. The lowest cost parse among the k-best parses may be determined. An extrinsic loss based upon an extrinsic loss function, the lowest cost parse and the 1-best parse may be determined. The first parsing parameter may be modified based on the determination of the intrinsic loss. The second parsing parameter may be modified based on the determination of the extrinsic loss, or the first parameter may be modified based on the determination of the intrinsic loss and the second parsing parameter may be modified based on the determining of the extrinsic loss.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

A dependency parser can output a best output for a given input in accordance with its own intrinsic scoring system. It is often observed that for certain downstream natural language processing tasks, the output determined to be the best output by the dependency parser is not the optimal output for the downstream task. Rather, another parse by the same parser can be better for the task than the parse that receives the highest intrinsic score. In accordance with embodiments of the disclosed subject matter, these better task-specific parses can be used to train the parser to improve its parses for previously unseen sentences for the given downstream application.

Figure 1:
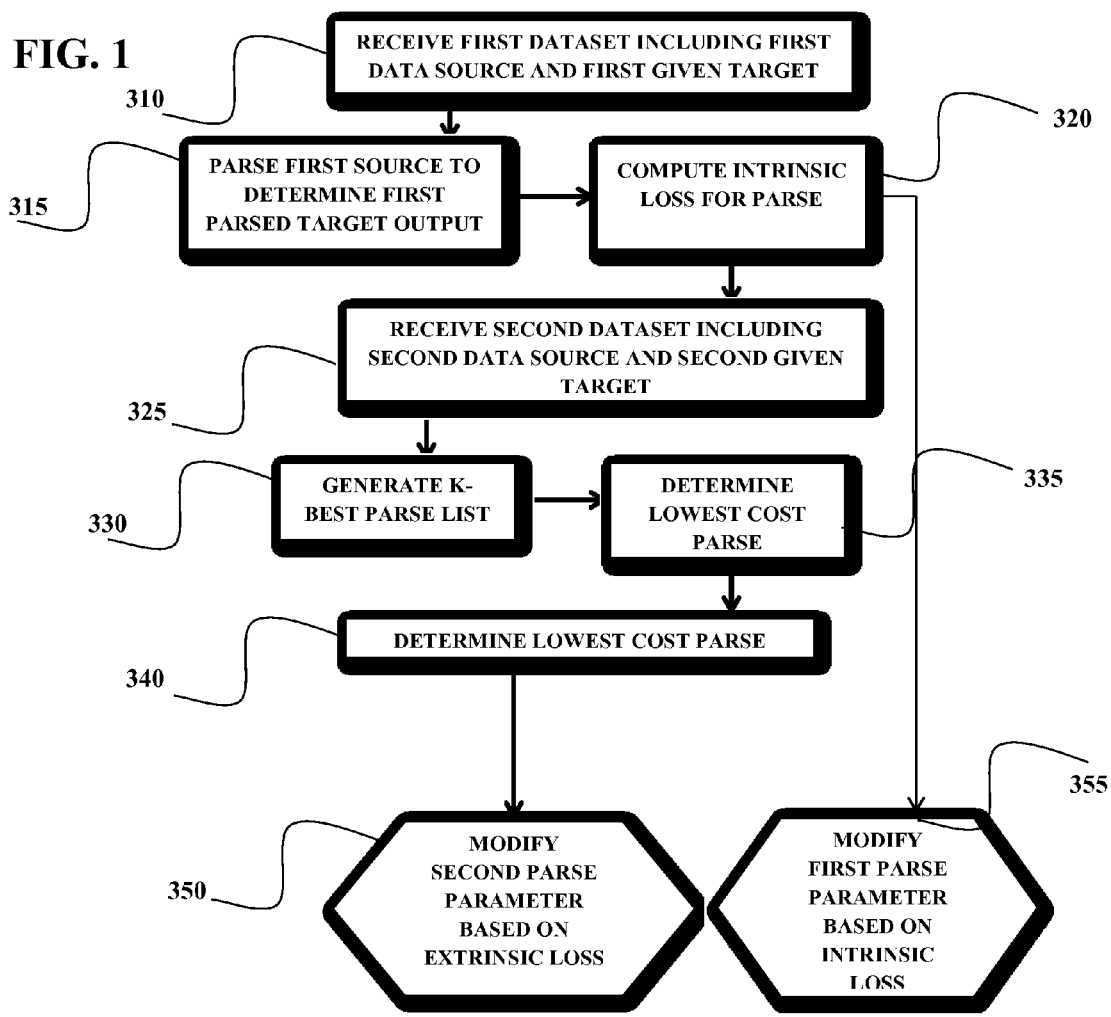
FIG. 1 shows a flowchart for training a dependency parser according to an embodiment of the disclosed subject matter.

As shown in FIG. 1, in order to train itself, the dependency parser may receive a first dataset $D^i$ with a pair which may contain a first given source $x_m^i$ and a corresponding first given target $y_m^i$ such that $d_m^i=(x_m^i, y_m^i)$ 310. The dependency parser can parse the first given source to determine a first parsed target output 315. This parsing can be executed using the dependency parser's parser data which contains at least a first parsing parameter. An example of a parsing parameter can include a label, a dependency, a dependency statistic, an order of a parse tree, etc. The first parsed target output can be the best parsed output for the first given source as determined by the dependency parser based on an intrinsic score. The score can be determined based on one or more of a variety of factors including, but not limited to, one or more of the highest count in the parser data, the highest probability of a certain output given the input, the output's position in an output table, etc.

An intrinsic loss may be determined 320 based upon an intrinsic loss function, the first parsed target and the first given target. The intrinsic loss function can be one or more of a human ranking of the output, a ROUGE score (e.g., a technique that compares an automatically produced output against a reference or a set of references or translations), a BLEU score (e.g., a technique that compares an output with a set of good quality reference outputs), a labeled attachment score (e.g., a score that, given a gold standard parse tree, penalizes parses that do not have the same parent and label assignment as the gold tree), an average arc length score (e.g., a score that, given a gold standard parse tree, can be based on the ratio of the length, for example, in number of words, between each correct parent and child node, divided by all possible lengths), transition based errors (e.g., based on a deterministic transformation of a gold standard tree to a series of parsing decisions and include a measurement of how often the parser makes the decisions derived from the gold standard tree), a METEOR score, or any other applicable criteria or a combination thereof.

According to implementations of the disclosed subject matter, the implementation may modify at least the first parsing parameter of the dependency parser based on the determination of the intrinsic loss 355. The modification to at least the first parsing parameter may be such that the parser is more likely to output a parse having one or more features similar to the first given target in subsequent parses of hitherto unseen inputs that are similar in some way to the first given source.

The dependency parser may receive a second dataset $D^{i2}$ with a pair which may contain a second given source $x_m^{i2}$ and a corresponding second given target $y_m^{i2}$ such that $d_m^{i2}=(x_m^{i2}, y_m^{i2})$ 325. The dependency parser can parse the second given source to generate a k-best list 330. The k-best list contains a list of parses which the dependency parser generates based on the second given source and the dependency parser's parser data which contains at least one second parsing parameter. The k-best parses may be in ascending ranking order such that the 1-best parse is the parse which receives the highest score within the dependency parser. The score used to determine the entries of the k-best list can be determined by using a variety of factors including, but not limited to, one or more of the count in the parser data, the probability of a certain output given the input, the output's position in an output table, etc.

Thereafter, a cost for the parses in the k-best list may be determined 335 based on the parses in the k-best list, a cost function and the second given target. The cost function may be used to determine the quality of the parses in the k-best list in comparison to the second given target. The second given target may be a known good output to the second given source. The cost function may be based on one or more of a human ranking of the output, a ROUGE score (e.g., a technique that compares an automatically produced output against a reference or a set of references or translations), a BLEU score (e.g., a technique that compares an output with a set of good quality reference outputs), a labeled attachment score (e.g., a score that, given a gold standard parse tree, penalizes parses that do not have the same parent and label assignment as the gold tree), an average arc length score (e.g., a score that, given a gold standard parse tree, can be based on the ratio of the length, for example, in number of words, between each correct parent and child node, divided by all possible lengths), transition based errors (e.g., based on a deterministic transformation of a gold standard tree to a series of parsing decisions and include a measurement of how often the parser makes the decisions derived from the gold standard tree), a METEOR score or any other applicable criteria or a combination thereof.

An extrinsic loss function, the lowest cost parse and the cost of the 1-best parse may be used to determine the extrinsic loss 340 of the k-best list. The extrinsic loss function may be implemented such that if the cost of the 1-best parse is the same as cost of the parse in the k-best list with the lowest cost, then the extrinsic loss of the k-best list is 0. If the cost of the 1-best parse is not the same as the cost of the parse in the k-best list with the lowest cost then the extrinsic loss of the k-best list is greater than 0.

According to embodiments of the disclosed subject matter, if the extrinsic loss of the k-best list is greater than 0, then the at least the second parsing parameter may be modified 355 such that the parser is more likely to output the second given target or the parse in the k-best list with the lowest cost as the 1-best parse of a k-best list in subsequent parses.

According to embodiments of the disclosed subject matter, the implementation may modify both the first parsing parameter of the dependency parser based on the intrinsic loss and the second parsing parameter of the dependency parser based on the determination of the extrinsic loss.

In an illustrative example of an embodiment of the disclosed subject matter, the dependency parser may be trained to translate from English to Spanish and receive a first dataset with a first given source of "water" and a corresponding first given target of "agua". The dependency parser may parse the given source using the dependency parser's parser data containing at least a first parsing parameter, wherein the first parsing parameter is the probability of the occurrence of translations of "water" into Spanish. In this illustrative example, the dependency parser outputs the parse "azul" as "azul" may have the highest probability of being the translation for "water" into Spanish according to the dependency parser. Therefore, "azul" would be the first parsed target output. The implementation would determine an intrinsic loss based upon an intrinsic loss function, the first parsed target output "azul" and the first given target "agua". Because the parsed translation by the dependency parser is not similar to the first given target "agua", it is likely that the parse will receive a high intrinsic loss. Based on this intrinsic loss, the implementation is likely to modify at least the first parsing parameter (the probability in this illustrative example) in order to decrease the likelihood of "azul" being returned as the parsed output for "water".

Embodiments of the disclosed subject matter can be implemented to improve performance in word re-ordering. For example, a sentence in a Subject-Verb-Object language, such as English, can be parsed into several highest intrinsically-ranked outputs. These can be scored using an extrinsic metric that is relevant to word orderings in a Verb-Subject-Object (VSO) language, such as German. The parser can be trained to produce better VSO word orderings in the SVO language based upon SVO inputs by selecting the parse with the highest extrinsic word order score from among the intrinsically highly-ranked parses. The parse that is selected need not be the highest intrinsically-ranked parse and can be added to a training set for the parser. In this way, a parser can be trained to produce better reordering results.

The dependency parser may be trained to parse a downstream application such as translation for text written by experts in the color trades, such as painters, dyers, clothiers, etc. For example, a parser may include parameters that indicate the likely translation of the word "chocolate" in English into various candidate Spanish words. The Spanish word "chocolate" (the Spanish word for confectionary chocolate) may be the most likely colloquial translation. A phrase table used by the parser may include a statistical parameter that indicates that "chocolate" in Spanish may be the most likely translation of the English "chocolate". This may especially be true after the parser is trained using intrinsic scoring against generic training data. However, in the color trades, "chocolate" more commonly refers to a color than a confection. Thus, the most likely translation for the English "chocolate" may be the Spanish "marrón", which represents a dark brown color. Embodiments of the disclosed subject matter can take this difference into account and train the parser to favor "marrón" more and "chocolate" less based on an extrinsic metric that is adapted to tune the parser for translating works related to the color trade. For example, Table 1 shows an example of a k-best list of parses of the work "chocolate" into 4 Spanish words, i.e., k is equal to 4. The candidate parses are listed in ascending ranking order based on the count values (an example of a statistical parameter) from the phrase table used by the parser.

TABLE 1

| K value | Translations of "chocolate" in Spanish | Count | Human Ranked Cost |
|---|---|---|---|
| 1 | chocolate | 15 | 6 |
| 2 | dulce | 9 | 4 |
| 3 | marrón | 6 | 0 |
| 4 | café | 4 | 2 |

Table 1 shows an extrinsic metric applied to produce an extrinsic cost (based on an extrinsic score, not shown) for each of the candidates. In this illustrative and non-limiting example, the cost is generated based upon scores provided by bilingual, human experts in the color trades. As shown in Table 1, the cost for the 3-best parse ("marrón") is rated by the human translators as the lowest cost parse in the k-best list. In accordance with embodiments of the disclosed subject matter, the extrinsic loss of the k-best list is greater than zero because the 1-best parse is not the parse in the k-best list with the lowest cost. As a result, the statistical parsing parameter associated with the word "marrón" in the phrase table may be modified, e.g., by increasing it from 6 to 10. This would cause the parser to rank "marrón" more highly as a candidate translation for the English word "chocolate", in effect bringing the parser into closer alignment with the need to accurately translate material written for the color trades. Several other such occurrences could ultimately render "marrón" the intrinsically highest-ranked translation for "chocolate". In this way, embodiments of the disclosed subject matter can train parsers to better perform for specific downstream applications.

In some embodiments of the disclosed subject matter, the first parsing parameter and the second parsing parameter can be the same parameter.

In some embodiments of the disclosed subject matter, the implementation may determine that the cost of the 1-best parse is the same as the cost of the parse in the k-best list with the lowest cost. Therefore, the extrinsic loss of the k-best list may be 0. The implementation may then increase the value of k to k' in order to increase the size of a k-best list from k to k'. The number of parses in the k'-best list can be greater than the number of parses in the k-best list. The dependency parser can parse the second given source to generate a k'-best list. The k'-best list can contain a list of parses that the dependency parser generates based on the second given source and the dependency parser's parser data, which can include at least one second parsing parameter. The k'-best parses may be in ascending ranking order such that the 1-best parse is the parse which receives the highest score within the dependency parser. A cost for the parses in the k'-best list may be determined based on the parses in the k'-best list, a cost function and the second given target. The cost function may be used to determine the quality of the parses in the k'-best list in comparison to the second given target. The second given target may be a known good output to the second given source. An extrinsic loss function, the lowest cost parse and the cost of the 1-best parse may be used to determine the extrinsic loss of the k'-best list. The extrinsic loss function may be implemented such that if the cost of the 1-best parse is the same as cost of the parse in the k'-best list with the lowest cost, then the extrinsic loss of the k-best list is 0. If the cost of the 1-best parse is not the same as the cost of the parse in the k-best list with the lowest cost then the extrinsic loss of the k'-best list is greater than 0.

The implementation may repeat the process of increasing the size of the list of parses until either the cost of the 1-best parse is not the same as the cost of the parse in the k'-best list with the lowest cost or for a finite number of iterations of increasing the size of the list.

In some embodiments of the disclosed subject matter, the implementation may determine that the cost of the 1-best parse is the same as the cost of the parse in the k-best list with the lowest cost. Therefore, the extrinsic loss of the k-best list may be 0. If the extrinsic loss is determined to be 0, then the dependency parser's determination of the 1-best parse using the parsing data may have produced the best result according to the extrinsic loss technique. Accordingly, the parser data may not be modified any parameters, or, it may modify the first parsing parameter or the second parsing parameter to increase the likelihood of the 1-best parse.

In some embodiments of the disclosed subject matter, the implementation may determine the intrinsic loss of a parse and the extrinsic loss of a k-best list in alternating order. For example, the implementation may first determine an intrinsic loss of a parse and thereafter determine an extrinsic loss of a parse. The implementation may repeat this sequence for a plurality of iterations.

In some embodiments of the disclosed subject matter, the implementation may determine the intrinsic loss of one or more parses for a plurality of iterations and thereafter the implementation may determine the extrinsic loss of one or more k-best lists for a plurality of iterations. For example, the implementation may train the dependency parser based on the intrinsic loss for multiple datasets. Thereafter, the implementation may train the dependency parser based on a downstream extrinsic loss measure for a plurality of parsed k-best lists.

In some embodiments of the disclosed subject matter, multiple k-best parses may be determined to have the lowest cost. For example, the 2-best parse and the 5-best parse may both be determined to have the lowest cost. In the event of such a tie, the implementation may select the parse with the lowest k value in order to determine the extrinsic loss. In this illustrative example, the implementation would select the 2-best parse over the 5-best parse because the 2-best parse has a lower k value (i.e. 2).

The implementation may add the parse with the lowest cost from the k-best parses to a set of training data for the dependency parser. The training data may be used by the parser to train itself for future parses or for training other parsers.

Figure 2:
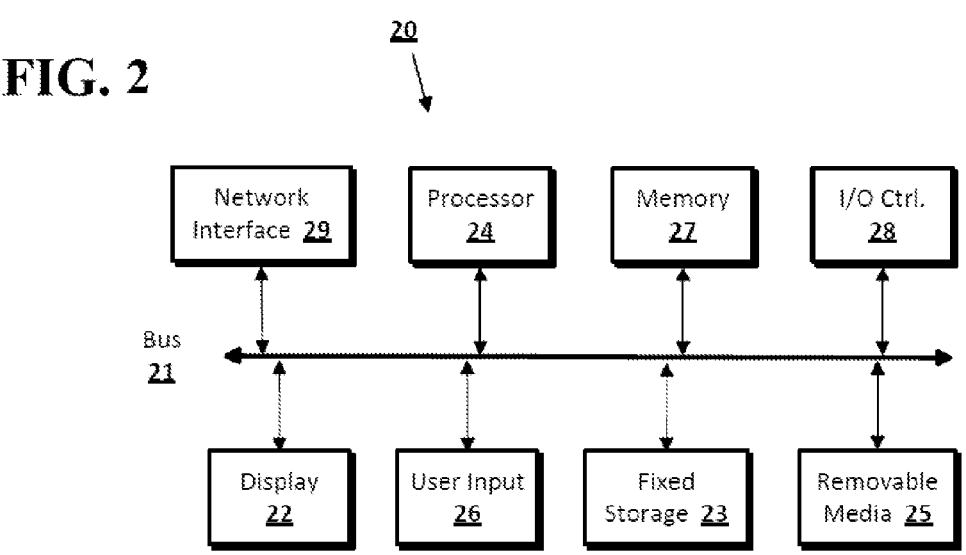
FIG. 2 shows a computer according to an embodiment of the disclosed subject matter.

Embodiments of the presently disclosed subject matter may be implemented in and used with a variety of component and network architectures. FIG. 2 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including a digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 3.

Many other devices or components (not shown) may be connected in a similar manner (e.g., document scanners, digital cameras and so on). Conversely, all of the components shown in FIG. 2 need not be present to practice the present disclosure. The components can be interconnected in different ways from that shown. The operation of a computer such as that shown in FIG. 2 is readily known in the art and is not discussed in detail in this application. Code to implement the present disclosure can be stored in computer-readable storage media such as one or more of the memory 27, fixed storage 23, removable media 25, or on a remote storage location.

Figure 3:
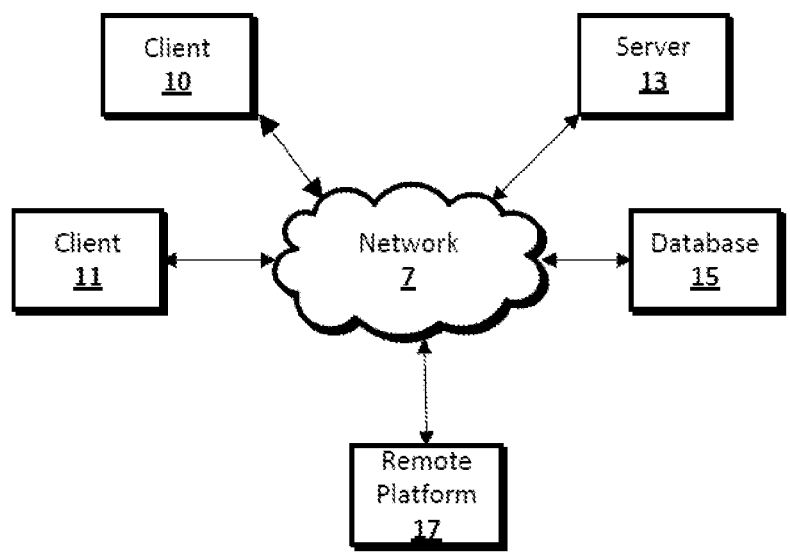
FIG. 3 shows a network configuration according to an embodiment of the disclosed subject matter.

FIG. 3 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description and following appendices, for purpose of explanation, have been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method, comprising, by a processor:
   receiving a first dataset including a first given source and a corresponding first given target;
   parsing the first given source to determine a first parsed target output in accordance with a parsing model having a first parsing parameter;
   determining an intrinsic loss based upon an intrinsic loss function, the first parsed target and the first given target;
   receiving a second dataset containing a second given source and a corresponding second given target;
   parsing the second given source input to generate k-best parses in accordance with the parsing model having a second parsing parameter, the k-best parses including a 1-best parse;
   determining a lowest cost parse among the k-best parses;
   determining an extrinsic loss based upon an extrinsic loss function, the lowest cost parse and the 1-best parse;
   modifying the first parsing parameter based on the determining the intrinsic loss, and;
   modifying the second parsing parameter based on the determining the extrinsic loss, or modifying the first parameter based on the determining the intrinsic loss and modifying the second parsing parameter based on the determining the extrinsic loss.

2. The method of claim 1, wherein the intrinsic loss function is based on a labeled attachment score.

3. The method of claim 1, wherein the intrinsic loss function is based on an average arc length score.

4. The method of claim 1, wherein the intrinsic loss function is based on transition based errors.

5. The method of claim 1, wherein the first parsing parameter is the same as the second parsing parameter.

6. The method of claim 1, wherein determining an extrinsic loss comprises:
   determining the lowest cost parse is the 1-best parse;
   selecting k' greater than k;
   parsing the second given source input to generate k'-best parses in accordance with the parsing model having a second parsing parameter, the k'-best parses including a 1-best parse of the k'-best parses;
   determining a lowest cost parse among the k'-best parses;
   determining an extrinsic loss based upon an extrinsic loss function, the lowest cost parse and the 1-best parse of the k'-best parses; and
   modifying the second parsing parameter based on the extrinsic loss.

7. The method of claim 1, wherein the parser is a graph based parser.

8. The method of claim 1, wherein the parser is a transition based parser.

9. The method of claim 1, wherein the parser is a chart parser.

10. A device, comprising:
    a database storing a first given target;
    a processor in connection with said database, said processor configured to:
      receive a first dataset including a first given source and the corresponding first given target;
      parse the first given source to determine a first parsed target output in accordance with a parsing model having a first parsing parameter;
      determine an intrinsic loss based upon an intrinsic loss function, the first parsed target and the first given target;
      receive a second dataset containing a second given source and a corresponding second given target;
      parse the second given source input to generate k-best parses in accordance with the parsing model having a second parsing parameter, the k-best parses including a 1-best parse;
      determine a lowest cost parse among the k-best parses;
      determine an extrinsic loss based upon an extrinsic loss function, the lowest cost parse and the 1-best parse;
      modify the first parsing parameter based on the determination of the intrinsic loss; and
      modify the second parsing parameter based on the determination of the extrinsic loss, or modify the first parameter based on the determination of the intrinsic loss and modify the second parsing parameter based on the determination of the extrinsic loss.

11. The device of claim 10, wherein the intrinsic loss function is based on a labeled attachment score.

12. The device of claim 10, wherein the intrinsic loss function is based on an average arc length score.

13. The device of claim 10, wherein the intrinsic loss function is based on transition based errors.

14. The device of claim 10, wherein the first parsing parameter is the same as the second parsing parameter.

15. The device of claim 10, wherein the processor is further configured to:
    determine the lowest cost parse is the 1-best parse;
    select k' greater than k;
    parse the second given source input to generate k'-best parses in accordance with the parsing model having a second parsing parameter, the k'-best parses including a 1-best parse of the k'-best parses;
    determine a lowest cost parse among the k'-best parses;

determine an extrinsic loss based upon an extrinsic loss function, the lowest cost parse and the 1-best parse of the k'-best parses; and modify the second parsing parameter based on the extrinsic loss.

16. A non-transitory computer readable medium storing a plurality of instructions that cause a computer to perform a method comprising:

receiving a first dataset including a first given source and a corresponding first given target;

parsing the first given source to determine a first parsed target output in accordance with a parsing model having a first parsing parameter;

determining an intrinsic loss based upon an intrinsic loss function, the first parsed target and the first given target;

receiving a second dataset containing a second given source and a corresponding second given target;

parsing the second given source input to generate k-best parses in accordance with the parsing model having a second parsing parameter, the k-best parses including a 1-best parse;

determining a lowest cost parse among the k-best parses;

determining an extrinsic loss based upon an extrinsic loss function, the lowest cost parse and the 1-best parse;

modifying the first parsing parameter based on the determining the intrinsic loss; and modifying the second parsing parameter based on the determining the extrinsic loss, or modifying the first parameter based on the determining the intrinsic loss and modifying the second parsing parameter based on the determining the extrinsic loss.

17. The non-transitory computer readable medium of claim 16 storing a plurality of instructions that cause a computer to further perform the method for determining an extrinsic loss comprising:

determining the lowest cost parse is the 1-best parse;

selecting k' greater than k;

parsing the second given source input to generate k'-best parses in accordance with the parsing model having a second parsing parameter, the k'-best parses including a 1-best parse of the k'-best parses;

determining a lowest cost parse among the k'-best parses;

determining an extrinsic loss based upon an extrinsic loss function, the lowest cost parse and the 1-best parse of the k'-best parses; and modifying the second parsing parameter based on the extrinsic loss.

18. The non-transitory computer readable medium of claim 16, wherein the parser is a transition based parser.

19. The non-transitory computer readable medium of claim 16, wherein the parser is a chart parser.

20. The non-transitory computer readable medium of claim 16, wherein the first parsing parameter is the same as the second parsing parameter.

* * * * *